United States Patent
Fasola et al.

(10) Patent No.: US 11,346,682 B2
(45) Date of Patent: May 31, 2022

(54) AUGMENTED 3D MAP

(71) Applicant: GM Cruise Holdings LLC, San Francisco, CA (US)

(72) Inventors: Juan Fasola, San Francisco, CA (US); Yu-Cheng Lin, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 306 days.

(21) Appl. No.: 16/456,961

(22) Filed: Jun. 28, 2019

(65) Prior Publication Data

US 2020/0408557 A1    Dec. 31, 2020

(51) Int. Cl.
| | |
|---|---|
| *G01C 21/36* | (2006.01) |
| *G05D 1/00* | (2006.01) |
| *G05D 1/02* | (2020.01) |
| *G06F 16/9035* | (2019.01) |
| *G06V 20/10* | (2022.01) |
| *G01C 21/32* | (2006.01) |

(52) U.S. Cl.
CPC ..... *G01C 21/3635* (2013.01); *G01C 21/3614* (2013.01); *G05D 1/0088* (2013.01); *G05D 1/0212* (2013.01); *G06F 16/9035* (2019.01); *G06V 20/10* (2022.01); *G05D 2201/0213* (2013.01)

(58) Field of Classification Search
USPC .......................................................... 701/436
See application file for complete search history.

(56) References Cited

U.S. PATENT DOCUMENTS

| | | | | |
|---|---|---|---|---|
| 2017/0123421 | A1* | 5/2017 | Kentley | ................. G06Q 10/00 |
| 2017/0123422 | A1* | 5/2017 | Kentley | ................. B60L 15/20 |
| 2017/0123429 | A1* | 5/2017 | Levinson | ............... G01C 21/34 |
| 2019/0065863 | A1 | 2/2019 | Luo et al. | |
| 2020/0408557 | A1* | 12/2020 | Fasola | .................... G01C 21/32 |

FOREIGN PATENT DOCUMENTS

| | | |
|---|---|---|
| WO | 2016210227 A1 | 12/2016 |
| WO | 2018126215 A1 | 7/2018 |

OTHER PUBLICATIONS

International Search Report and Written Opinion for International Application No. PCT/US2019/068315, dated Apr. 17, 2020, 10 pages.

* cited by examiner

*Primary Examiner* — Tyler D Paige
(74) *Attorney, Agent, or Firm* — Polsinelli, PC (57) ABSTRACT

The present technology provides systems, methods, and devices that can dynamically augment aspects of a map as an autonomous vehicle navigates a route, and therefore avoids the need for dispatching a special purpose mapping vehicle to keep navigating a route. As the autonomous vehicle navigates a route, the autonomous vehicle can determine that current data captured by at least one sensor of the autonomous vehicle describing a location is inconsistent with the primary map of the location. The autonomous vehicle can determine that a portion of the current data describes a second feature that is distinct from a first feature described by a primary map. The second feature can be added to an augmented map that is based on the primary map, and the position of the autonomous vehicle can be located with respect to the first feature rather than the second feature on the augmented map.

20 Claims, 7 Drawing Sheets

AUGMENTED 3D MAP

TECHNICAL FIELD

The present technology pertains to dynamically updating a portion of a map database using data captured by an autonomous vehicle, and more specifically pertains to updating a portion of an augmented map database having high-resolution data using low-resolution data obtained from an autonomous vehicle.

BACKGROUND

An autonomous vehicle is a motorized vehicle that can navigate without a human driver. An exemplary autonomous vehicle includes a plurality of sensor systems, such as, but not limited to, a camera sensor system, a LIDAR sensor system, a radar sensor system, amongst others, where the autonomous vehicle operates based upon sensor signals output by the sensor systems. Specifically, the sensor signals are provided to an internal computing system in communication with the plurality of sensor systems, where a processor executes instructions based upon the sensor signals to control a mechanical system of the autonomous vehicle, such as a vehicle propulsion system, a braking system, or a steering system.

The autonomous vehicle navigates using a combination of data captured by at least one sensor of the autonomous vehicle and an authoritative map stored on the autonomous vehicle. The authoritative map is commonly created using a special purpose mapping vehicle which captures data at a much higher resolution than the at least one sensor on the autonomous vehicle. The autonomous vehicle uses the authoritative map to not only map routes to destinations, but also to determine its location on the road. However, the configuration of roads commonly changes due to construction or other factors. When this happens the authoritative map reflects inconsistencies as compared with current conditions, and the road portions where the inconsistencies exist become areas where the autonomous vehicle is in danger of becoming mis-localized. A mechanism for preserving correct location awareness is needed when road conditions change.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a technology that can quickly augment a primary, authoritative map stored on the autonomous vehicle that reflects inconsistencies as compared with current conditions without the need for an update to the primary map.

The autonomous vehicle navigates using a combination of data captured by at least one sensor of the autonomous vehicle and a map stored on the autonomous vehicle. The primary map is commonly created using a special purpose mapping vehicle which captures data at a much higher resolution than the at least one sensor on the autonomous vehicle. In this way, the primary map that informs autonomous vehicle navigation is generated before navigation, so that routes to specific destinations can be determined as soon as a destination is received. However, environmental conditions can change since the special purpose mapping vehicle mapped the route. For example, if there is construction on the road since the last time the special purpose mapping vehicle mapped the route, and the autonomous vehicle relies on the primary map's boundaries to drive, then the autonomous vehicle would not behave correctly on the road since the lane lines have been modified. This problem is especially amplified when construction, such as scaffolding, follows the general contours of the a building or other feature the autonomous vehicle uses to estimate its location—in that case, the autonomous vehicle may mistake the scaffolding for the building, and attempt to locate itself with respect to the scaffolding as it navigates. This can cause the autonomous vehicle's estimated location to deviate from its true location, causing it to deviate on the road during navigation (such as causing the autonomous vehicle to drive off center to a lane, on the wrong side of the road, etc.).

The disclosed technology therefore enables various embodiments to find areas where current conditions have changed with respect to the map while keeping the location estimation of the autonomous vehicle accurate. The autonomous vehicle can determine which portions of the primary map can be trusted vs needs updating, detecting road features on a live basis, and/or decide when to call remote assistance after stopping the autonomous vehicle when the autonomous vehicle is in danger of becoming mis-localized.

An autonomous vehicle, for example, can navigate when road conditions have changed by using a combination of data captured by at least one sensor of the autonomous vehicle and an augmented map used for routing the autonomous vehicle. The augmented map can overlay new detected road features on a primary map that was initially created using a special purpose mapping vehicle. In some embodiments, the primary map can include data that was captured at a much higher resolution than the sensors on the autonomous vehicle. However, when the configuration and current conditions of roads changes due to construction or other factors, the lower resolution sensors can detect new features well enough to continue navigating without losing the autonomous vehicle's location. Since navigation failures can occur for autonomous vehicles until the primary map is updated, the augmented map serves as way for autonomous vehicles to continue to navigate without requiring an update to the high-resolution primary map, where a significant period of time can pass before the high-resolution primary map can be updated.

The present technology provides a system that can create an augmented map using data from the sensors of the autonomous vehicle, and therefore avoids the need for updates to the primary map. This makes autonomous vehicle navigation more efficient and significantly reduces mis-localization issues during the amount of time before a map update can be issued. The present technology is tolerant to real world-map inconsistencies, and allows the autonomous vehicle to navigate before a primary map update can be issued. Therefore, the periods in which areas are restricted to autonomous vehicles due to outdated maps are shortened.

In the following systems and methods, as the autonomous vehicle navigates the route, the autonomous vehicle can determine that current data captured by at least one sensor of the autonomous vehicle observes data that is inconsistent with the primary map. The autonomous vehicle can determine that a portion of the current data describes a new or unexpected feature that is distinct from a first feature described by a primary map. The new feature can be added to an augmented map that is based on the primary map, and the position of the autonomous vehicle can be localized with respect to the first feature rather than the new feature on the augmented map.

Figure 1:
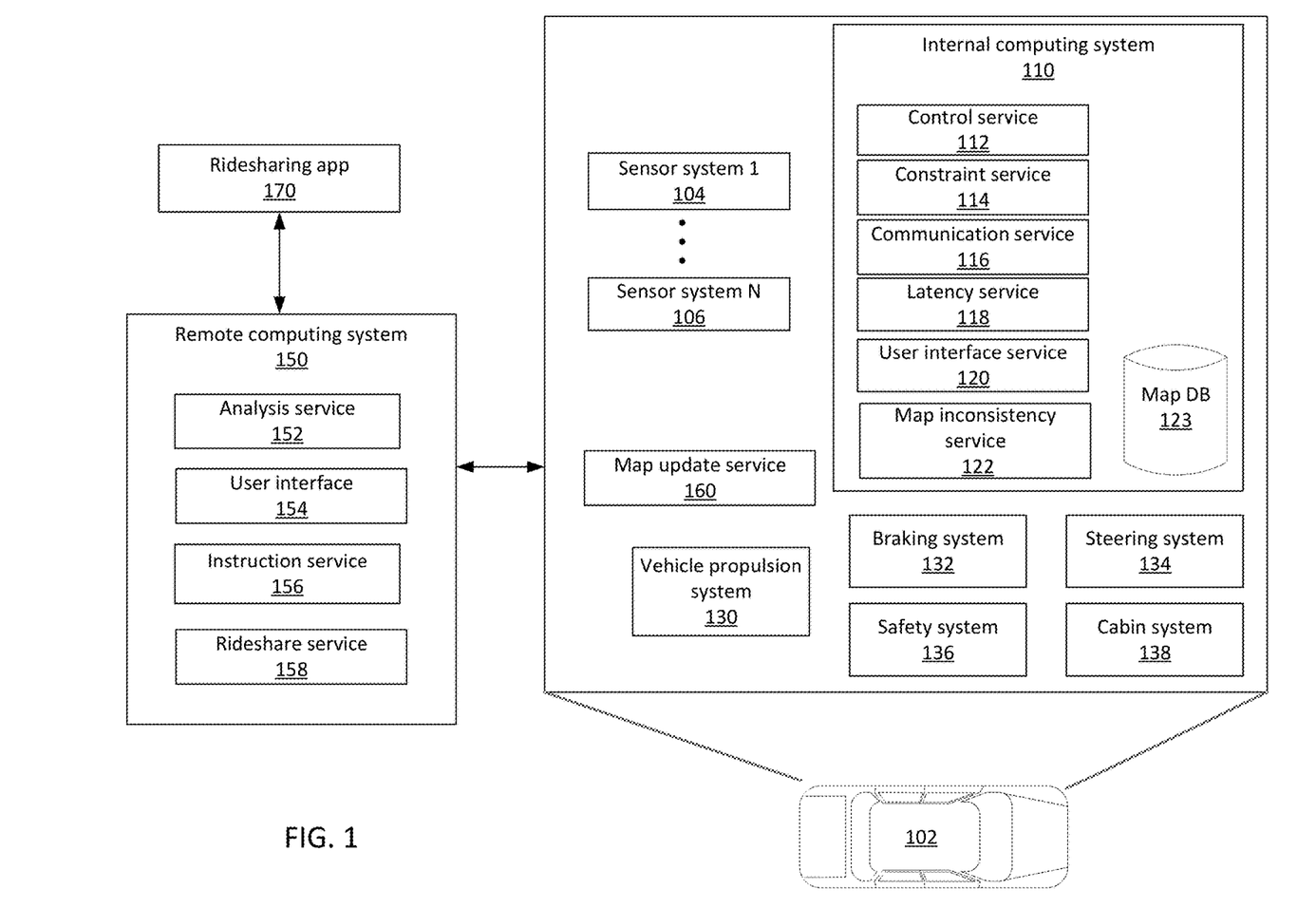
FIG. 1 shows an example system for piloting and management of an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver using sensor signals output by sensor systems 104-106 of the autonomous vehicle 102 and a map stored in map database 123, such as a high resolution primary map or an augmented map that overlays updates to the primary map. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a LIDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, map updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The map inconsistency service 122 can compare current data collected by sensors 104-106 to the primary map stored in map database 123. The primary map, for example, can be created using pre-mapped data. The configuration of roads commonly changes due to repainting, construction, or other factors. When this happens, the map inconsistency service 122 determines that the primary map stored in map database 123 reflects inconsistencies as compared with current conditions, and the road portions where the inconsistencies exist can be flagged and added to an augmented map for the autonomous vehicle until the primary map is updated (although in some instances, like construction, the change in conditions may not be permanent and so the primary map may not be updated to ever reflect it). The map inconsistency service 122 can communicate with map update service 160 via the communication service 116 to receive updated portions of the primary map.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, map updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As introduced above, the present technology provides a system that can identify changed aspects of the primary map stored on the autonomous vehicle's 102 map database 123 using low-resolution data from the at least one sensor 104-106 of the autonomous vehicle 102. In some embodiments, the initial map can include pre-mapped data that includes a high density of points obtained from a high-resolution LIDAR system on a special purpose mapping vehicle, otherwise referred to as a high-resolution point map, and semantic labels that identify features represented in the high density of points obtained from the high-resolution LIDAR system. The semantic labels can identify features such as buildings, lane lines, line colors, driveways, locations of stop signs and stoplights, crosswalks, etc. In one or more embodiments, an augmented map can further overlay the primary map with low-resolution point map data indicative of updates to the pre-mapped features as described herein.

In some embodiments, the present technology can use low-resolution data from the at least one sensor 104-106 of the autonomous vehicle 102 to detect new features, and distinguish new features from old features within the existing high density of points obtained from the high-resolution LIDAR system already represented in the stored pre-mapped map.

Figure 2:
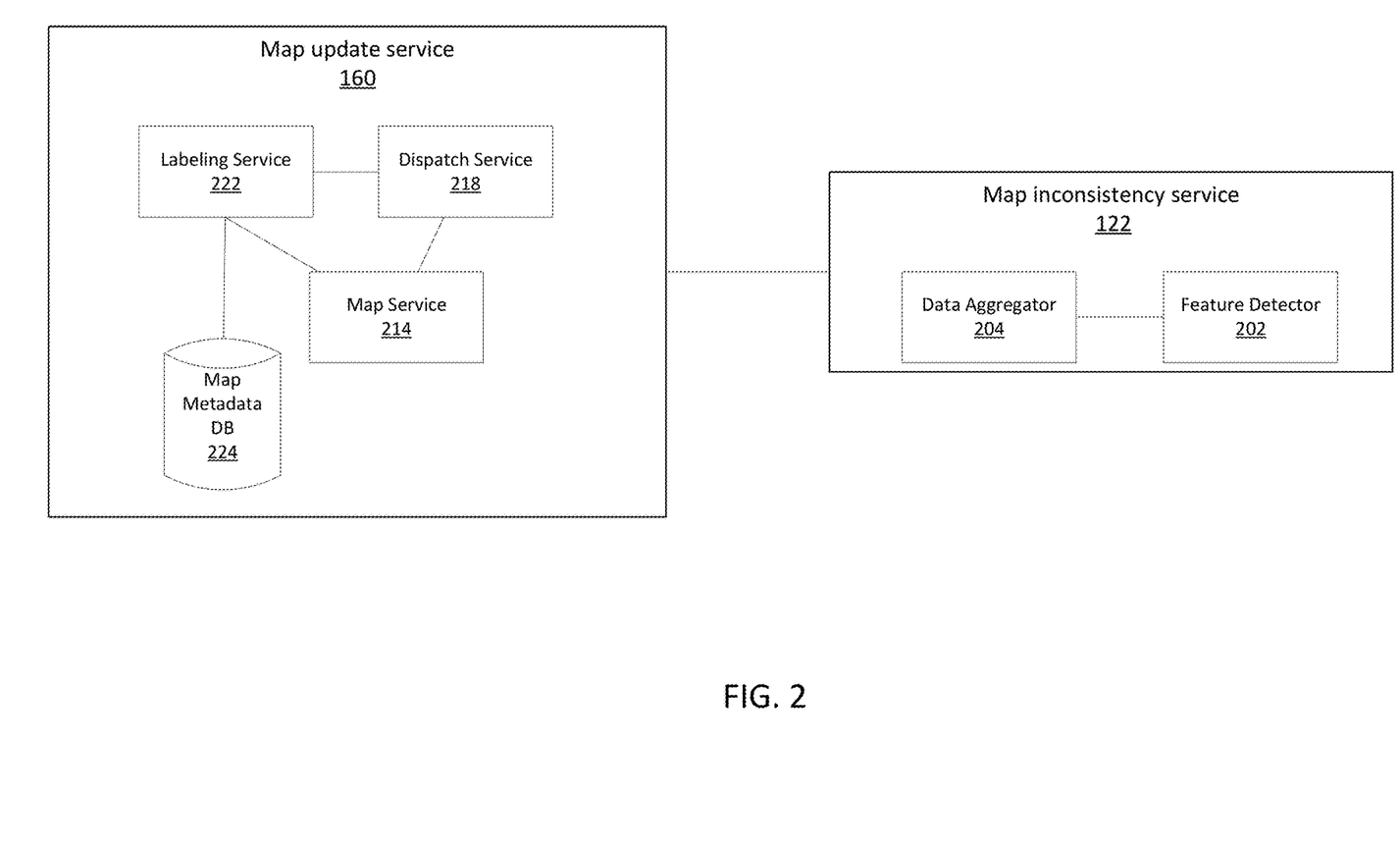
FIG. 2 shows an example system for updating an augmented map portion to resolve inconsistencies between the map portion and sensor data in accordance with some aspects of the present technology.

FIG. 2 illustrates an example system embodiment showing the map update service 160 and the map inconsistency service 122 in greater detail. While the system illustrated in FIG. 2 is discussed with respect to the method illustrated in FIG. 5, it should be appreciated that each of the figures represents their own separate embodiment and should not be limited by such cross-reference between the figures except as defined in the claims.

The map inconsistency service 122 functions to determine when features illustrated in the pre-mapped high definition map stored in map database 123 are inconsistent with features in current data detected by sensors 104-106. While in some embodiments sensors 104-106 may capture data at a lower resolution than is reflected in the high definition map, the current data captured by sensors 104-106 can be sufficient to determine such inconsistencies. Detecting these inconsistencies is important because the high definition map can become outdated and no longer reflect the configuration of the road, which can cause navigational issues when the autonomous vehicle becomes mis-localized with its surroundings. The current data from sensors 104-106 reflect the current configuration of the road.

As the autonomous vehicle 102 navigates a route, sensors 104-106 capture current data reflecting the environment around the autonomous vehicle 102. The data aggregator 204 can accumulate the current data from the at least one sensor 104-106 as the autonomous vehicle 102 passes through a geographic area. Even over a small distance, data aggregator 204 can accumulate current data from the same sensor as the sensor continuously collects data. For example, in the case of a LIDAR sensor, the LIDAR continuously creates a point map from current data collected from the environment around the autonomous vehicle 102, and this data is aggregated by data aggregator 204.

While current data is being captured by the at least one sensor 104-106 of the autonomous vehicle 102, in some embodiments the feature detector 202 can detect new features represented in the captured current data, and can compare the detected features in the current data with features represented in the pre-mapped data, e.g. the primary map stored in map database 123.

In some instances, the feature detector 202 can determine that the feature in the current data is different than the feature represented in the pre-mapped data. For example, the autonomous vehicle can use a point cloud registration model to minimize the distance to features in a point cloud in order to localize itself within its surroundings. When the environment changes, especially in a way that is similar to a pre-existing feature (e.g., construction facade that looks like a parallel wall shift in lidar space, for example), the point cloud registration model can compute faulty estimates. Any point from the lidar scan that does not match the primary map will get added to the augmented map, which is then used to compare scans. In this way, the autonomous vehicle may isolate the changes between the current environment and the primary map to minimize faulty estimates of the autonomous vehicle's pose and to detect 3D map changes. Other examples of changes or inconsistencies might include the addition or removal of construction barricades and cones, a lane line, the presence or absence of a crosswalk, the presence or absence of a stop sign or streetlight, the location of a stop sign or streetlight, etc.

If the feature detector 202 determines that the pre-mapped data does not reflect the features as represented in the current data, the feature detector 202 can publish the location and type of inconsistency detected. For example, if the feature detector 202 determines that scaffolding is present in a location but is not reflected in the pre-mapped data, then the feature detector 202 can identify the location where the scaffolding has been detected and identify a feature boundary change.

The data aggregator 204 can mark the accumulated current data from the at least one sensor 104-106 as reflecting a detected change, and the data aggregator 204 can send the accumulated current data reflecting the inconsistency to the map update service 160. For example, the accumulated current data can include a low-resolution point map reflecting the inconsistency. The accumulated current data may also have any other sensor information from the autonomous vehicle 102, such as camera data to determine lane color or bounding boxes, which can assist and be incorporated into an update to the map.

In some embodiments, the pre-mapped data can be stored as a collection of map portions. In such embodiments, the data aggregator 204 may stop sending the accumulated current data reflecting the inconsistency to the map update service 160 when the current data that the data aggregator 204 is receiving no longer applies to that map portion. The data aggregator 204 can continue to collect current data reflecting the inconsistency with respect to a different map portion. In some embodiments, a map portion can be defined by a geographic boundary having location coordinates such as might be reflected on a tile of a physical map. The map service 214 can indicate the current data as low-resolution data, which can be used to provide an augmented 3D map in local memory.

Once the current data received has been stored and put under management of map service 214 as a version of an augmented map portion, the labeling service 222 can retrieve the version of the augmented map portion that shows the inconsistency with the pre-mapped data map portion on the primary map, and review the low-resolution current data against the pre-mapped data map portion to confirm the existence of the inconsistency.

In some embodiments, if the labeling service 222 confirms the inconsistency, the autonomous vehicle 102 can continue to navigate as long as the scope of the changes would not make driving unsafe. In some embodiments, the autonomous vehicle 102 may be able to dynamically analyze the changes and navigate accordingly.

In some embodiments, the labeling service 222 can further determine whether the inconsistency can be remedied with the low-resolution current data. If so, then the augmented map can be used to track differences in the live data verses the primary map in order to accurately determine and estimate autonomous vehicle pose. If the inconsistency is of such a permanent nature that new high-resolution data is required, the dispatch service 218 can schedule a special purpose map vehicle to remap the location represented in the map portion. New high-resolution data can be required when large map portions are inconsistent, details of the inconsistency are not sufficiently clear to relabel the map portion, or for data deemed critical for the piloting of the autonomous vehicle 102. An example of a critical inconsistency that might require new high-resolution data would include new buildings and permanent obstacles, extensive repainting in the drivable area related to new intersections, the addition of a new light rail line, etc.

When the labeling service 222 determines that the inconsistency can be remedied with the low-resolution current data, the labeling service 222 can analyze the received low-resolution current data and the pre-mapped data to relabel the map data, which yields an augmented map data portion. The labeling service 222 can be performed using heuristics to identify patterns that require relabeling, or can utilize machine learning algorithms to perform the relabeling.

The labeling service 222 can associate the augmented map data portion with the sources of data used to create it, which includes the low-resolution current data from the autonomous vehicle 102 sensor 104-106, and the high-resolution pre-mapped data from the previous version of the map portion which provides the high definition map points addressed above, and stores this information in the map metadata database 224. If new revisions are made to the augmented map data portion, the labeling service 222 may save the updated low-resolution current data from the autonomous vehicle 102 sensor 104-106, upon which the new augmented map data portion was based, into the map metadata database 224. The low-resolution current data may be versioned and appropriately associated with the corresponding augmented map data portion.

Figure 3A:
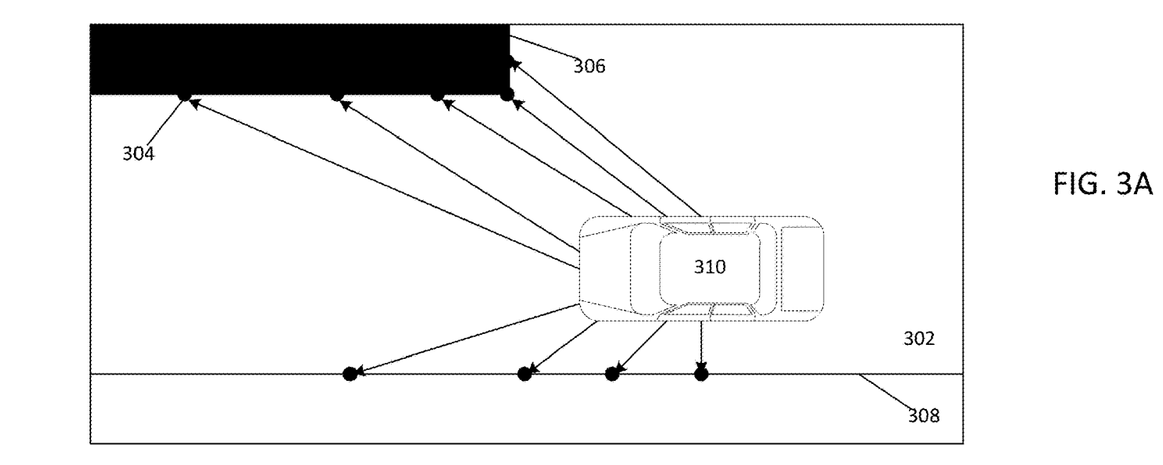
FIG. 3A shows an example visualization of autonomous vehicle location estimation in accordance with some aspects of the present technology.

FIG. 3A shows an example visualization of autonomous vehicle location estimation in accordance with some aspects of the present technology. As autonomous vehicle 310 navigates down road 302, sensors systems on autonomous vehicle 310 can gather current data about autonomous vehicle 310's environment. For example, the sensor systems can be LIDAR sensors that gather point cloud information in real time or near real time as the autonomous vehicle 310 is driving.

The autonomous vehicle 310 can include both a primary map and a live augmented map. The primary map can include pre-mapped LIDAR point data from a high-resolution LIDAR sensor system on a special purpose mapping vehicle that creates a high-resolution point cloud. The augmented map, by contrast, can include live data measurements from onboard sensors of the autonomous vehicle 310 that captures the current data in a lower resolution than the high-resolution sensor system. The current data can be, for example, a lower resolution point cloud from a LIDAR system on the autonomous vehicle 310 that shows the current environment.

Any point within the current data can be compared to the primary map, so that the autonomous vehicle 310 can properly locate itself as it navigates road 302. The autonomous vehicle 310, for example, can perform a nearest neighbor search for each lidar point 304 of the current data of the environment captured by the sensors of the autonomous vehicle 310. In this example embodiment, autonomous vehicle 310 captures lidar points 304 that detect current features along road 302, such as building 306 and road boundary 308. In this instance, building 306 and road boundary 308 are consistent with the primary map, and the autonomous vehicle 310 can then use those features to accurately locate itself on road 302.

Figure 3B:
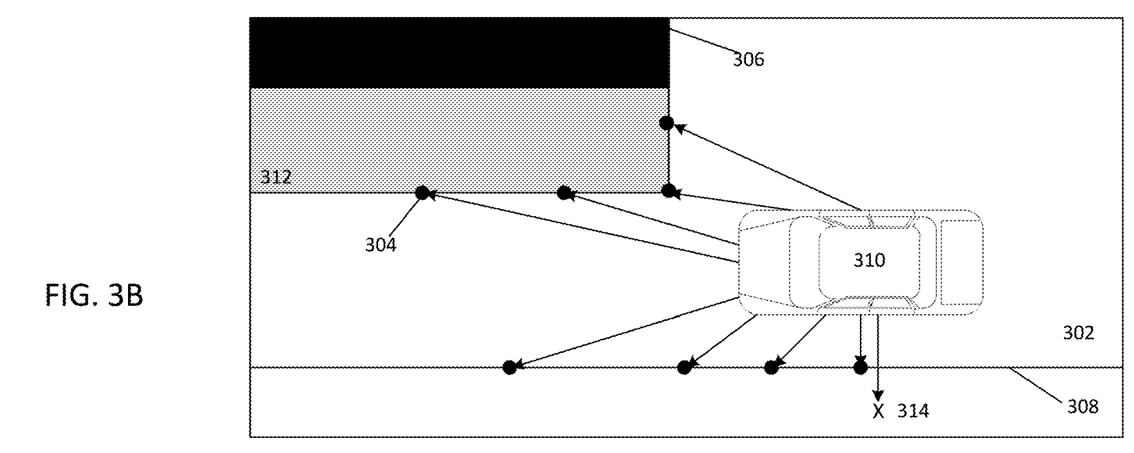
FIG. 3B shows an example visualization of autonomous vehicle location estimation when there are inconsistencies with the primary map in accordance with some aspects of the present technology.

FIG. 3B shows an example visualization of autonomous vehicle location estimation when there are inconsistencies with the primary map in accordance with some aspects of the present technology. FIG. 3B shows the autonomous vehicle 310 navigating down road 302 at a time subsequent to FIG. 3A. During this time, construction façade 312 has been added which looks like a parallel wall shift of building 306 in lidar space. If the construction façade 312 is mistakenly interpreted as building 306, then the autonomous vehicle 310 will attempt to re-locate itself to where it thinks building 306 is located, thus causing a shift to position 314, which is off road 302. This error occurs because the point cloud registration model attempts to match the environmental change to an obsolete map (e.g., building 306 in the primary map) and outputs local minima based on it. Even though the point cloud registration model has internal heuristics to detect these errors to notify High-Fidelity Localization (HFL) downstream of faulty optimization results, the heuristics do not cover all failures.

Moreover, even in the cases where the point cloud registration model successfully detected an optimization fault and performed self-rejection correctly, the HFL still loses accuracy due to unavailable global pose updates from the point cloud registration model. If the autonomous vehicle 310 experiences extended outage, HFL estimates can drift. Inaccurate pose estimates will then degrade performance to all the nodes that uses the primary map for routing the autonomous vehicle 310.

To prevent this, the autonomous vehicle 310 can include both the primary map and a live augmented map. The primary map can includes high-resolution lidar point data regarding a previously mapped understanding of the environment. The augmented map can be a local map of lidar information gathered from sensors in real-time while the autonomous vehicle 310 is driving. Any point from the lidar scan that does not match the primary map will get added to the augmented map, which is then used to compare scans. In this way, the autonomous vehicle 310 may isolate the changes between the current environment and the primary map to minimize faulty estimates of the autonomous vehicle's 310 pose and to detect 3D map changes.

For example, as autonomous vehicle 310 navigates road 302, sensors on autonomous vehicle 310 can gather current data describing feature(s) within a location that are inconsistent with the primary map of the location. In this example embodiment, autonomous vehicle 310 can determine from the current lidar point cloud data that the feature of construction façade 312 is distinct from the feature of building 306 described by the primary map. An augmented map can be created from the current lidar point cloud data from the sensors of the autonomous vehicle 310 in real time while the autonomous vehicle 310 is navigating the route.

Distinct, new features, such as construction façade 312, can be added to the augmented map as an overlay on the primary map. In some embodiments, the augmented map is local to the autonomous vehicle and is stored for only a certain period of time (since the new feature may be temporary and as a result, does not need to be added to the primary map). To do this, for each input point of the current data of the environment captured by the sensors, a nearest neighbor search can be performed to the primary map and the augmented map.

The autonomous vehicle 310 compares the current data to primary map and the augmented map. If the new feature is observed for the first time (e.g., the autonomous vehicle 310 has never seen construction façade 312 before, or no longer has construction façade 312 in memory within the augmented map), then the new feature will appear as a subset of lidar cloud points that is inconsistent with the primary map. For example, the lidar cloud points for construction façade 312 will be located at a different position than the lidar cloud points for building 306. However, at the same time, some lidar cloud points will match with the primary map for features that remain unchanged, such as the lidar cloud points for road boundary 308. Because there are a certain number of lidar cloud points that match features within the primary map, the autonomous vehicle 310 can determine the lidar point cloud for construction façade 312 indicates a different feature than building 306, rather than the autonomous vehicle 310 being shifted with respect to building 306.

Figure 3C:
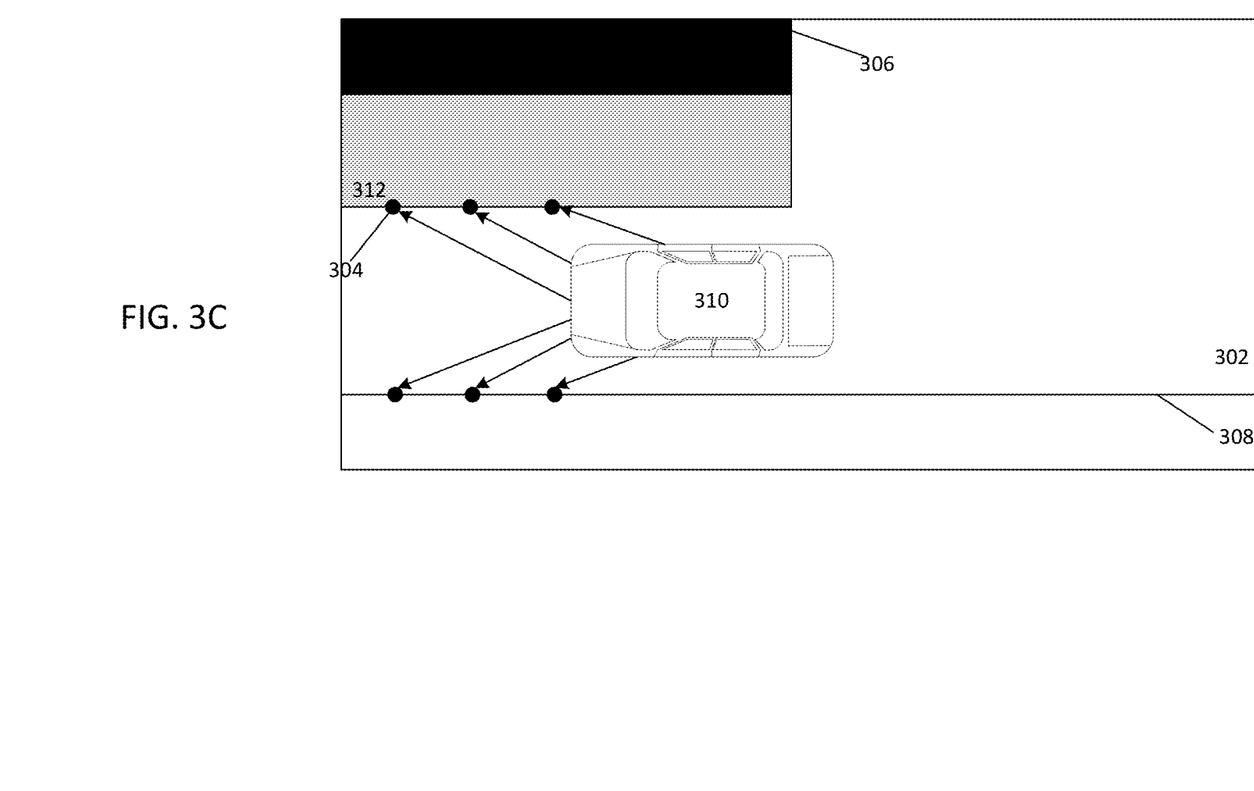
FIG. 3C shows an example visualization of autonomous vehicle navigation when there are inconsistencies with the primary map in accordance with some aspects of the present technology.

In some embodiments, the point cloud registration model can store new features and accurately locate the autonomous vehicle 310 over some distance before the location estimate drifts. FIG. 3C shows an example visualization of autonomous vehicle navigation when there have been inconsistencies with the primary map over a certain distance in accordance with some aspects of the present technology. The example visualization shows autonomous vehicle 310 having travelled further down road 302. In this case, autonomous vehicle 310 sees and maps more of construction façade 312 within the augmented map, and locates its position with respect to feature 306 and/or feature 308 rather than the construction façade 312.

Because the augmented map can be stored on the autonomous vehicle 310, the current data can be compared to data captured by the sensors at previous times, and can confirm that the construction façade 312 is a new feature (not on the primary map) because it was detected at the previous times.

The augmented map can allow the autonomous vehicle 310 to continue to navigate down road 302 despite the primary map being out of date as long as the augmented map retains a proper location of autonomous vehicle 310. The autonomous vehicle 310 can determine there is mis-localization even with the augmented map (and subsequently be brought to a gentle stop), when after iterating over data from one or more previous time periods, there is a current data jump in localization over a threshold value. In alternative embodiments, the autonomous vehicle 310 can be brought to a stop after a predetermined distance.

Figure 4A:
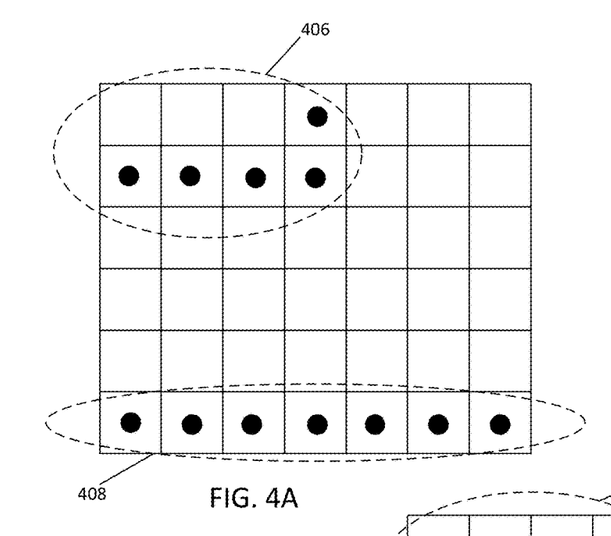
FIG. 4A shows an example point map in accordance with some aspects of the present technology.

FIG. 4A shows an example point map showing a part of the primary map in accordance with some aspects of the present technology. The point map can show features 406 (corresponding to, for example, building 306) and feature 408 (corresponding to, for example, road boundary 308). The primary map can include high resolution point clouds from pre-mapped data collected by a LIDAR system on a special purpose mapping vehicle.

Figure 4B:
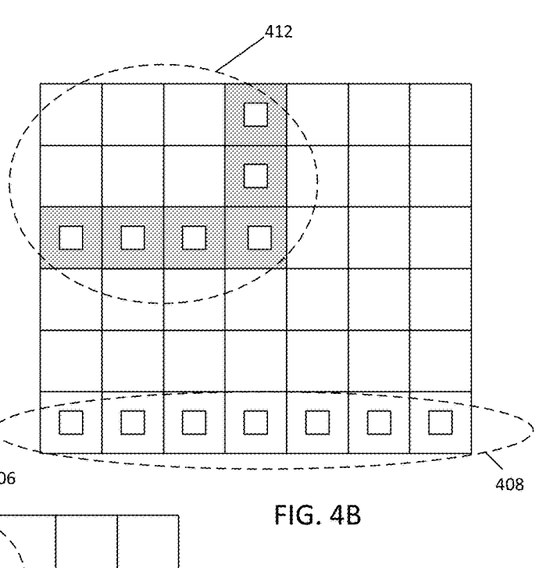
FIG. 4B shows an example point map including inconsistencies with the primary map in accordance with some aspects of the present technology.

FIG. 4B shows an example point map detected by sensors on the autonomous vehicle 310 in accordance with some aspects of the present technology. As an autonomous vehicle 310 navigates a route, it can determine that a portion of current data is a new feature that is distinct from a feature described by the primary map in FIG. 4A based on the portion of the current data captured by at least one sensor of the autonomous vehicle describing a location being inconsistent with the primary map of the location. In this case, the point cloud for feature 412 (corresponding to, for example, construction façade 312) is at a different location than where feature 406 is expected to be on the primary map. The sensor(s) of the autonomous vehicle can capture the current data in a lower resolution than the high-resolution sensor system.

The autonomous vehicle can confirm that features within the current data are new, different, and/or distinct from features within the primary map when a first subset of the lidar point cloud describing the new feature is inconsistent with the primary map, and a second subset of the lidar point cloud that does not describe the new feature is consistent with the primary map (e.g., some of the surroundings match the primary map enough to determine that an inconsistency with the primary map is due to a new feature rather than location estimation drifting). In some embodiments, new features can be confirmed when a threshold number of the lidar point cloud matches with the primary map.

For example, the lidar point cloud of feature 408 matches feature 408 of the primary map of FIG. 4A, while the lidar point cloud for feature 412 does not—it is in a different position than feature 406. Since feature 408 matches the primary map, feature 412 can be confirmed as a new feature, such as a construction façade similar to feature 312 in FIGS. 3B and 3C.

Figure 4C:
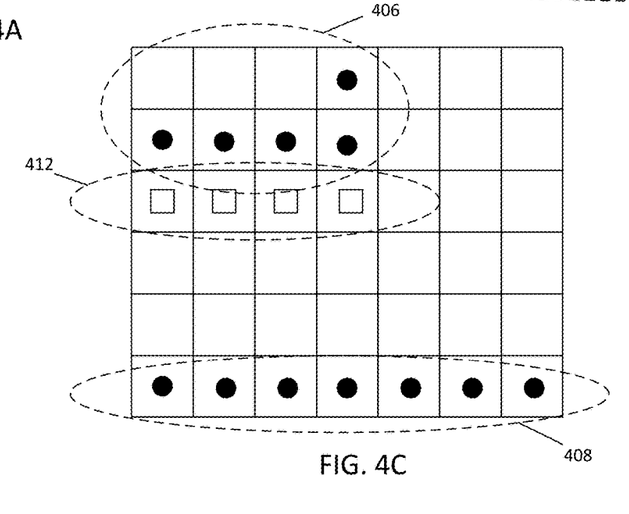
FIG. 4C shows an example augmented point map including inconsistencies with the primary map in accordance with some aspects of the present technology.

FIG. 4C shows an example point map including inconsistencies with the primary map in accordance with some aspects of the present technology. FIG. 4C shows an augmented map that has overlaid new features to the primary map. For example, new feature 412 has been added to the augmented map, and is shown in relation to feature 408 and feature 406. The autonomous vehicle can then be located correctly with respect to feature 408 rather than feature 412 (mistaken to be feature 406).

In some embodiments, FIG. 4C can be a live 3D augmented map around the autonomous vehicle that can be implemented (either by a 3D sliding buffer, a KD-tree, a custom data structure that allows quick nearest neighbor query or similar techniques) to serve multiple purposes. First, the live 3D augmented map can be used to fact-check against the primary map. If a point from a lidar scan has an untrustworthy match to the primary map, and a trustworthy match to the live augmented map, then this point is likely from construction or other new features. Untrustworthy matches can be, for example, based on a feature appearing in a different position than expected (e.g., construction facades), can be new features, and/or can be noise within the data due to pedestrians, weather (e.g., fog), etc. For example, for each lidar point of the current data, lidar points can be clustered based on the lidar points defining a stationary shape of a feature over threshold likelihood. But if the lidar points are below the threshold likelihood, then it can be determined that the sensors detected pedestrians, moving targets, fog, etc. and those lidar points can be removed as noise.

Generally, confirming the new feature can be based on a metric measuring the probability of a distance to a point cloud, such as a threshold of one, but not limited to, the following metrics: Euclidean distance, point to plane distance, Gaussian likelihood (inverse of General ICP (GICP) cost), etc. If the majority of the lidar point cloud matches against the primary map proves untrustworthy, the point cloud registration model can align lidar point clouds to the live augmented map for a block or two to estimate location. The allowed length of this location estimate against the augmented map can depend on the rate of drifting (e.g., mis-localization rate). In some embodiments, the point classification logic can be omitted and compares the mahalanobis distance (GICP cost function) when a lidar point has matches to both the primary map and the augmented map.

In some embodiments, for each point from the lidar scan, prior to any location estimate, the lidar point's nearest neighbor is found in both the augmented map and the primary map. After the nearest neighbor association has been made, the trustworthiness of the two matches can be evaluated by a set of heuristics (e.g., Euclidean distance, point to plane distance, Gaussian likelihood (inverse of GICP cost), etc.). A pair of point matches can fall categories based on whether a point is trustworthy/untrustworthy/not matched in either the primary map or the augmented map.

In some embodiments, in the case where the lidar point only has a match to one of the maps, the point data pair can be added to an intermediate buffer for optimization later. However, if the lidar point has matches against both maps, the pair that contributes less to the GICP cost function can be chosen. This heuristic generally favors the augmented map matches, which is the desirable behavior since the augmented map has more recent information.

Any given scan can have a healthy mix of lidar points of all categories. The point cloud registration model shall not trip up just because it observed a couple untrustworthy points. However, if the lidar scan has terrible matches with both maps, the point cloud registration model can report a failure. For example, if a threshold of lidar points is exceeded that are untrustworthy matches, and/or fewer than another threshold of lidar points are trustworthy matches, the point cloud registration model can report a failure and return early because of insufficient trustworthy information.

In some embodiments, if the point cloud registration model does not return early, it can first rejects lidar points in the untrustworthy categories (e.g., no match to one or both the primary and augmented maps). These lidar points could become trustworthy after a few point cloud registration model iterations. However, if the few iterations can make these points trustworthy, these iterations will likely cause a substantial jump in localization. Regardless of whether the final result is correct or not, the output can lead to a non-smooth trajectory, and this trajectory will require drift sentinel to safely stop the autonomous vehicle. Also, the point cloud registration model already operates assuming the input seed pose provided by HFL is already close to the correct location. In some embodiments, the point cloud registration model would have reported failure anyways if the autonomous vehicle's pose moves too far from the seed pose. Moreover, the previous check which requires more than the first threshold of the lidar points to fall in the trustworthy categories should render the points in the untrustworthy categories insignificant to the location estimate anyway.

Figure 5:
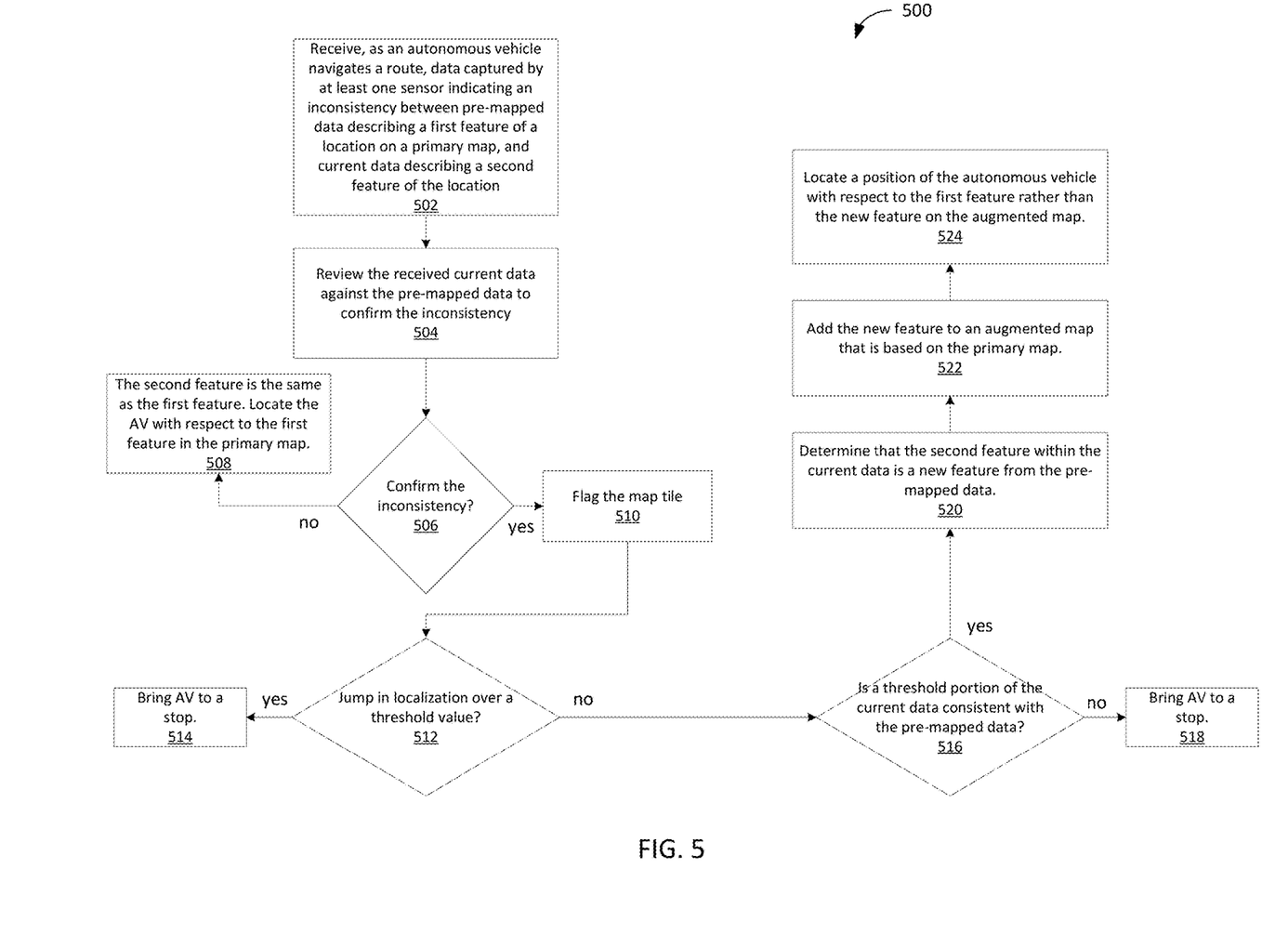
FIG. 5 shows an example method for generating an augmented map to resolve inconsistencies between the map portion and sensor data in accordance with some aspects of the present technology.

FIG. 5 shows an example method for generating an augmented map to resolve inconsistencies between the map portion and sensor data in accordance with some aspects of the present technology. Method 500 can provide an augmented map in local memory to track differences in the live, augmented map vs the primary map in order to accurately determine and estimate autonomous vehicle pose.

Method 500 can begin when the autonomous vehicle receives (502), as it navigates a route, data captured by at least one sensor indicating an inconsistency between pre-mapped data describing a first feature of a location on a primary map, and current data describing a second feature of the location. The received current data can be reviewed (504) against the pre-mapped data to confirm the inconsistency.

If the inconsistency is not confirmed (506), then the second feature is the same as the first feature. The autonomous vehicle can then be located (508) with respect to the first feature in the primary map.

If the inconsistency is confirmed (506), then the map tile with the inconsistency can be flagged (510). If there is a jump (512) in localization over a threshold value, indicating that the location estimate has shifted quickly, then the autonomous vehicle can be brought to a safe stop (514). If not, then the autonomous vehicle can check if there are any areas consistent with the primary map to reliably locate the autonomous vehicle.

If a threshold portion of the current data is not consistent (516) with the pre-mapped data, then the autonomous vehicle can be brought to a safe stop (518). However, if the threshold portion of the current data is consistent/matches (516) with the pre-mapped data, then the autonomous vehicle can determine (520) that the second feature within the current data is a new feature from the pre-mapped data. The new feature can be added (522) to an augmented map that is based on the primary map. The position of the autonomous vehicle can be located (524) with respect to the first feature rather than the new feature on the augmented map.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 6:
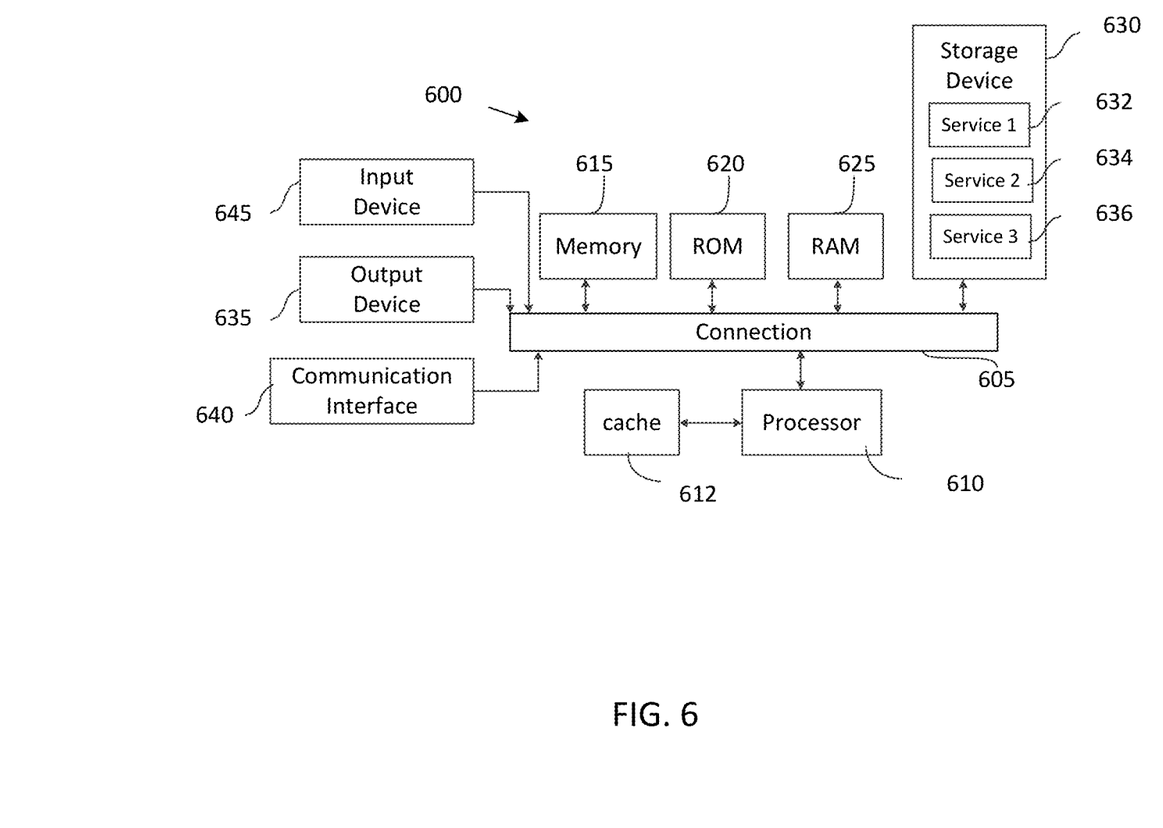
FIG. 6 shows an example of a system for implementing certain aspects of the present technology.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of updating a map database, the method comprising:
   as an autonomous vehicle navigates a route, generating an augmented map based on current data captured by at least one sensor of the autonomous vehicle, wherein the augmented map is a collection of map portions based on the current data;
   determining that a map portion of the current data for a location includes a second feature that is distinct from a first feature described by a primary map for the location, the primary map stored, prior to the generating the augmented map, on a map database associated with the autonomous vehicle;
   in response to determining that the second feature is distinct from the first feature, comparing other map portions of the current data with the primary map to determine a number of inconsistent map portions;
   determining whether to transmit a notification to the autonomous vehicle to stop navigating the route based on the number of inconsistent map portions; and
   determining whether to add the second feature to the augmented map that is based on the primary map and locate a position of the autonomous vehicle with respect to the first feature rather than the second feature on the augmented map to continue navigating the route based on the number of inconsistent map portions.

2. The method of claim 1, further comprising:
   for each input point of the current data of an environment captured by the at least one sensor of the autonomous vehicle, performing a nearest neighbor search to the primary map and the augmented map; and
   determining that the current data is the second feature that is distinct from the first feature when a first subset of input points describing the second feature is inconsistent with the primary map, and a second subset of input points that does not describe the second feature is consistent with the primary map, wherein the second subset of input points is over a threshold match with the primary map.

3. The method of claim 1, further comprising:
   comparing the current data to data captured by the at least one sensor of the autonomous vehicle at a previous time; and
   confirming the second feature in the current data from a detection of the second feature at the previous time.

4. The method of claim 1, further comprising generating the augmented map by gathering lidar information from the at least one sensor of the autonomous vehicle in real time while the autonomous vehicle is navigating the route, and wherein the augmented map is local to the autonomous vehicle.

5. The method of claim 1, further comprising:
   for each input point of the current data of an environment captured by the at least one sensor of the autonomous vehicle, clustering a first subset of input points based on the first subset of input points defining a stationary shape of a feature over a threshold likelihood; and
   removing a second subset of input points based on the second subset of input points below the threshold likelihood.

6. The method of claim 1, wherein the at least one sensor of the autonomous vehicle captures the current data in a lower resolution than a high-resolution sensor system, wherein pre-mapped data from the high-resolution sensor system is a high-resolution point cloud from a LIDAR system on a special purpose mapping vehicle, and the current data is a lower resolution point cloud from the LIDAR system on the autonomous vehicle.

7. The method of claim 1, further comprising:
iterating over data from one or more previous time periods; and
when the second feature of the current data jumps in localization over a threshold value compared to previous data from the one or more previous time periods, causing the autonomous vehicle to come to a stop.

8. A computing system for updating a map database, the system comprising:
at least one non-transitory computer readable medium comprising instructions stored thereon, wherein the instructions are effective to cause the computing system to:
as an autonomous vehicle navigates a route, generate an augmented map based on current data captured by at least one sensor of the autonomous vehicle, wherein the augmented map is a collection of map portions based on the current data;
determine that a map portion of the current data for a location includes a second feature that is distinct from a first feature described by a primary map for the location, the primary map stored, prior to the generating the augmented map, on a map database associated with the autonomous vehicle;
in response to determining that the second feature is distinct from the first feature, compare other map portions of the current data with the primary map to determine a number of inconsistent map portions;
determine whether to transmit a notification to the autonomous vehicle to stop navigating the route based on the number of inconsistent map portions; and
determine whether to add the second feature to the augmented map that is based on the primary map and locate a position of the autonomous vehicle with respect to the first feature rather than the second feature on the augmented map to continue navigating the route based on the number of inconsistent map portions.

9. The computing system of claim 8, wherein the instructions are effective to cause the computing system to further:
for each input point of the current data of an environment captured by the at least one sensor of the autonomous vehicle, perform a nearest neighbor search to the primary map and the augmented map; and
determine that the current data is the second feature that is distinct from the first feature when a first subset of input points describing the second feature is inconsistent with the primary map, and a second subset of input points that does not describe the second feature is consistent with the primary map, wherein the second subset of input points is over a threshold match with the primary map.

10. The computing system of claim 8, wherein the instructions are effective to cause the computing system to further:
compare the current data to data captured by the at least one sensor of the autonomous vehicle at a previous time; and
confirm the second feature in the current data from a detection of the second feature at the previous time.

11. The computing system of claim 8, wherein the instructions are effective to cause the computing system to further generate the augmented map by gathering lidar information from the at least one sensor of the autonomous vehicle in real time while the autonomous vehicle is navigating the route, and wherein the augmented map is local to the autonomous vehicle.

12. The computing system of claim 8, wherein the instructions are effective to cause the computing system to further:
for each input point of the current data of an environment captured by the at least one sensor of the autonomous vehicle, cluster a first subset of input points based on the first subset of input points defining a stationary shape of a feature over a threshold likelihood; and
remove a second subset of input points based on the second subset of input points below the threshold likelihood.

13. The computing system of claim 8, wherein the at least one sensor of the autonomous vehicle captures the current data in a lower resolution than a high-resolution sensor system, wherein pre-mapped data from the high-resolution sensor system is a high-resolution point cloud from a LIDAR system on a special purpose mapping vehicle, and the current data is a lower resolution point cloud from the LIDAR system on the autonomous vehicle.

14. The computing system of claim 8, wherein the instructions are effective to cause the computing system to further:
iterate over data from one or more previous time periods; and
when the second feature of the current data jumps in localization over a threshold value compared to previous data from the one or more previous time periods, cause the autonomous vehicle to come to a stop.

15. At least one non-transitory computer readable medium, for updating a map database, comprising instructions stored thereon, wherein the instructions are effective to cause an autonomous vehicle to:
as the autonomous vehicle navigates a route, generate an augmented map based on current data captured by at least one sensor of the autonomous vehicle, wherein the augmented map is a collection of map portions based on the current data;
determine that a map portion of the current data for a location includes a second feature that is distinct from a first feature described by a primary map for the location, the primary map stored, prior to the generating the augmented map, on a map database associated with the autonomous vehicle;
in response to determining that the second feature is distinct from the first feature, compare other portions of the current data with the primary map to determine a number of inconsistent map portions;
determine whether to transmit a notification to the autonomous vehicle to stop navigating the route based on the number of inconsistent map portions; and
determine whether to add the second feature to the augmented map that is based on the primary map; and locate a position of the autonomous vehicle with respect to the first feature rather than the second feature on the augmented map to continue navigating the route based on the number of inconsistent map portions.

16. The at least one non-transitory computer readable medium of claim 15, wherein the instructions are effective to cause the autonomous vehicle to:
for each input point of the current data of an environment captured by the at least one sensor of the autonomous vehicle, perform a nearest neighbor search to the primary map and the augmented map; and determine that the current data is the second feature that is distinct from the first feature when a first subset of input points describing the second feature is inconsistent with the primary map, and a second subset of input points that does not describe the second feature is consistent with the primary map, wherein the second subset of input points is over a threshold match with the primary map.

17. The at least one non-transitory computer readable medium of claim 15, wherein the instructions are effective to cause the autonomous vehicle to:

compare the current data to data captured by the at least one sensor of the autonomous vehicle at a previous time; and confirm the second feature in the current data from a detection of the second feature at the previous time.

18. The at least one non-transitory computer readable medium of claim 15, wherein the instructions are effective to cause the autonomous vehicle to:

generate the augmented map by gathering lidar information from the at least one sensor of the autonomous vehicle in real time while the autonomous vehicle is navigating an the route, and wherein the augmented map is local to the autonomous vehicle.

19. The at least one non-transitory computer readable medium of claim 15, wherein the instructions are effective to cause the autonomous vehicle to:

for each input point of the current data of an environment captured by the at least one sensor of the autonomous vehicle, cluster a first subset of input points based on the first subset of input points defining a stationary shape of a feature over a threshold likelihood; and remove a second subset of input points based on the second subset of input points below the threshold likelihood.

20. The at least one non-transitory computer readable medium of claim 15, wherein the instructions are effective to cause the autonomous vehicle to:

iterate over data from one or more previous time periods; and when the second feature of the current data jumps in localization over a threshold value compared to previous data from the one or more previous time periods, cause the autonomous vehicle to come to a stop.

* * * * *